(12) United States Patent
McCuskey

(10) Patent No.: US 12,093,920 B2
(45) Date of Patent: *Sep. 17, 2024

(54) TAG-BASED SOCIAL INTERACTION COMPUTING SYSTEM AND METHOD

(71) Applicant: Scott A. McCuskey, Boardman, OH (US)

(72) Inventor: Scott A. McCuskey, Boardman, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/213,315

(22) Filed: Jun. 23, 2023

(65) Prior Publication Data

US 2023/0334465 A1 Oct. 19, 2023

Related U.S. Application Data

(63) Continuation of application No. 17/375,777, filed on Jul. 14, 2021, now Pat. No. 11,687,909.

(60) Provisional application No. 63/177,442, filed on Apr. 21, 2021, provisional application No. 63/088,102, filed on Oct. 6, 2020, provisional application No. 63/052,449, filed on Jul. 15, 2020.

(51) Int. Cl.
| | |
|---|---|
| *G06Q 20/32* | (2012.01) |
| *G06F 21/62* | (2013.01) |
| *G06F 21/60* | (2013.01) |
| *G06Q 20/40* | (2012.01) |
| *G06Q 20/42* | (2012.01) |

(52) U.S. Cl.
CPC ..... *G06Q 20/3265* (2020.05); *G06F 21/6254* (2013.01); *G06Q 20/325* (2013.01)

(58) Field of Classification Search
CPC .. G06Q 20/3265; G06Q 20/325; G06Q 20/32; G06Q 20/3223; G06Q 20/3278; G06Q 20/403; G06Q 20/405; G06Q 20/42; G06F 21/6254; G06F 21/606; G06F 21/6245
USPC .......................................................... 705/39
See application file for complete search history.

(56) References Cited

U.S. PATENT DOCUMENTS

| | | | |
|---|---|---|---|
| 2011/0307343 A1* | 12/2011 | Lee ..................... | G06Q 30/0601 705/26.1 |
| 2013/0238490 A1* | 9/2013 | Bouey .................... | G06Q 20/10 705/39 |
| 2014/0280005 A1* | 9/2014 | Powers .................. | H04L 51/52 707/706 |

(Continued)

FOREIGN PATENT DOCUMENTS

WO WO-2013126772 A1 * 8/2013 ....... G06F 17/30557

OTHER PUBLICATIONS

Thompson ("Banking 101: What are Peer-to-Peer (P2P) Payments?", retrieved from https://www.depositaccount.coms/blog/p2p-payments.html, Sep. 18, 2019, 4 pages) (Year: 2019).*

(Continued)

*Primary Examiner* — James D Nigh
(74) *Attorney, Agent, or Firm* — Frost Brown Todd LLP

(57) ABSTRACT

Systems and methods for providing tag-based social interaction are provided. Users generate tags that allows a third party to connect with the user. Personally identifiable information of the user can be obfuscated, thereby allowing a user to send random acts of kindness, payments, gift cards, or other types of communications to other users while remaining anonymous.

20 Claims, 17 Drawing Sheets

(56) References Cited

U.S. PATENT DOCUMENTS

2016/0142379 A1* 5/2016 Tawakol ............. H04L 63/0421
726/1
2019/0342249 A1* 11/2019 Holmes ................ H04L 67/306

OTHER PUBLICATIONS

Bruehl ("Introducing Current ~tags", retrieved from https://current.com/blog/introducing-customizable-current-tags-for-mobile-payments/, Dec. 10, 2019, 5 pages) (Year: 2019).*

Finding Your Vessel with USCG Boat Names Searches, downloaded from https://maritimedocumentation.us/finding-your-vessel-with-uscg-boat-names-searches/ Mar. 13, 2020, 8 pages (Year: 2020).*

* cited by examiner

TAG-BASED SOCIAL INTERACTION COMPUTING SYSTEM AND METHOD

CROSS-REFERENCE TO RELATED APPLICATIONS

This application is a continuation of US Ser. No. 17/375.777 filed on Jul. 14, 2021, which claims the benefit of U.S. Ser. No. 63/052,449 filed on Jul. 15, 2020; U.S. Ser. No. 63/088,102 filed on Oct. 6, 2020; and U.S. Ser. No. 63/177,442 filed on Apr. 21, 2021, and the disclosure of each is incorporated herein by reference.

FIELD

The present application generally relates to making social connections through available personal identifiable information, and more particularly to using tags to incentivize and encourage social interactions.

BACKGROUND

People generally like to interact with other people who share common interests. However, it can be difficult to initiate social interactions with strangers.

Social media platforms, such as Facebook™, Twitter™, Instagram™, Snapchat™, etc., allow users to communicate with one another. However, users need to know other user's names or specific handles on the social media platform in order to use those platforms to initiate social interactions. Users can join groups that cater to specific interests, however that requires interested users to both know of the existence of those specific groups and to join and actively participate in those groups.

BRIEF DESCRIPTION OF THE DRAWINGS

Various embodiments will become better understood with regard to the following descriptions, appended claims, and accompanying drawings, wherein:

FIG. 4 illustrates an example tag edit screen suitable for display on the touchscreen interface of a user's smartphone or other suitable computing device.

FIG. 9 illustrates an address book for display on the touchscreen interface of a user's smartphone or other suitable computing device.

DETAILED DESCRIPTION

Figure 1:
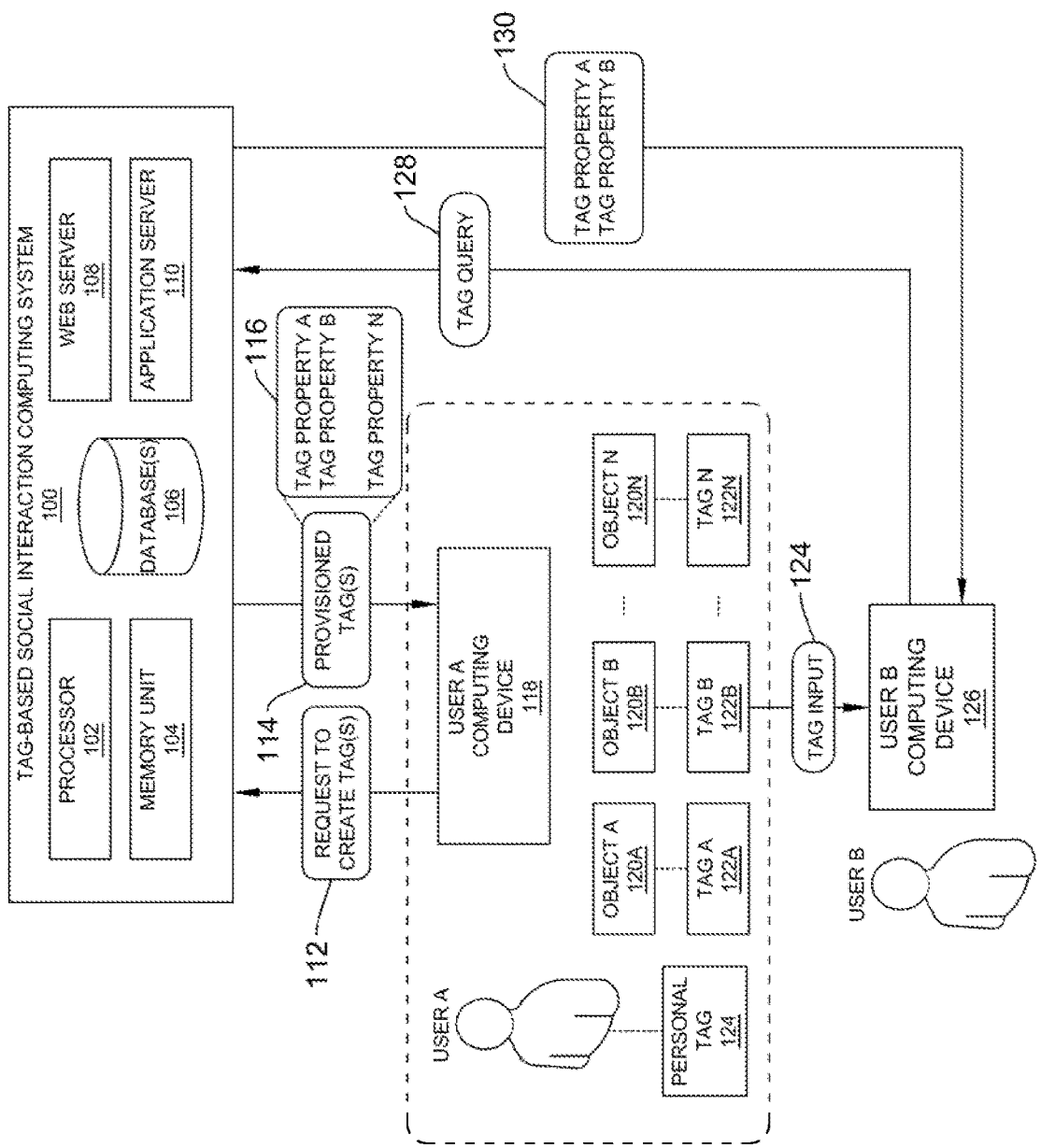
FIG. 1 depicts a tag-based social interaction computing system in accordance with one non-limiting embodiment.

Various non-limiting embodiments of the present disclosure will be described to provide an overall understanding of the principles of the tag-based social interaction computing systems and methods disclosed herein. One or more examples of these non-limiting embodiments are illustrated in the selected examples. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems, or methods unless specifically designated as mandatory.

In this disclosure, any identification of specific techniques, arrangements, etc. is either related to a specific example presented or is merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible.

It will be appreciated that modifications to the disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that, unless otherwise specified or required by context, any explicit or implicit ordering of steps performed in the execution of a method does not imply that those steps must be performed in the order presented but, instead, may be performed in a different order or in parallel.

Throughout this disclosure, references to components or modules generally refer to items that can be grouped logically together to perform a function or group of related functions. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software.

Many people are generous and helpful when provided the opportunity. For example, people will donate to causes they deem worthy, such as the United Way, or help out a friend or neighbor in need. For example, somebody who has had an unfortunate event happen to them, such as an accident or illness that incurs large medical bills, may set up a Go Fund Me page to receive donations. People also give gifts or money to people simply because they want to, for example by giving tips at the holidays to people they interact with on a daily basis, by buying lemonade from a kid's lemonade stand, or even by putting money into the tip jar of a street performer. The tag-based social interaction computing system and method provides an easy to use platform that allows users to send or receive random acts of kindness from friends or strangers.

In order to receive a random act of kindness, a user generates a special tag in the tag-based social interaction computing system or provides personal identifiable information to the tag-based social interaction computing system. The tag or personal identifiable information allows a third party to connect with the user and send a random act of kindness through the tag-based social interaction computing system.

In a first example, a street performer can generate a tag that is placed on a tip jar or a nearby placard. A user can scan the tag using the camera of their mobile device and send a tip through an application associated with tag-based social interaction computing system that is running on their mobile device. The tag-based social interaction computing system allows a user to set up various payment options. For example a user can associated a credit card or a bank account with their user account by entering credit card information or bank routing information. A user can also use services such as PayPal™ or Venmo™ to send and receive payments. The user can also send or receive coupon codes or other codes as payment as would be understood in the art. For example, a user can send or receive an Amazon™ gift code that is redeemable for a specific amount of money to make purchases through the Amazon website. A user's information can include a link to their Amazon wish list which would allow other users to purchase the desired items instead of sending cash. For example, a couple that is getting married could include a tag with their invitation and their user information associated with that tag can include a link to their Amazon wish list or links to items at other stores. Similarly, a tag for a baby shower could include links to a wish list of desired baby items.

In another example, staff such as a waitress, bartender, or a member of a cleaning staff can allow their name and place of employment to be searchable on the tag-based social interaction computing system. Patrons can use the application to search for the staff member and send a random act of kindness directly to the staff member without worrying whether a different staff member may inadvertently take the tip instead. The staff member can allow a picture of themselves to be included with search results on the tag-based social interaction computing system to assist users with correctly identifying the staff member in question.

In yet another example, a person may generate a tag simply to receive random acts of kindness from friends or strangers. For example, a user may generate a tag that is placed on their vehicle or allow their license plate or home address to be searchable so that vendors can directly solicit the user with offers, such as a gift card to a nearby restaurant or coffee shop that has just opened, or a gift certificate for a courtesy or reduced cost lawn mowing from a lawn mowing service that is trying to generate new business. The tag-based social interaction computing system can similarly be used for contests and other promotions.

In still other examples, people can use tags as a way to accept payments. For example, children operating lemonade stands can generate tags that allow people to buy their lemonade using the tag-based social interaction computing system. Advantageously, the children not only may generate business from people who aren't carrying cash on them, but also may receive large anonymous tips from people who may be just passing by and feel generous.

The tag-based social interaction computing system and method also allows users to introduce themselves to other people without requiring direct face to face contact. This advantageously reduces the social anxiety of making an introduction. People who may otherwise avoid social situations for fear of rejection can send messages of introduction or tokens of appreciation in hopes of connecting with people that might have common interests.

For example, boat owners typically give creative and humorous names to their boats that are emblazoned on the back of their boats. If the boat owner allows their boat name to be searchable on tag-based social interaction computing system, other users can search for the boat name and leave a greeting, message, or random act of kindness for the owner. For example, a user who wanted to invite other boaters to a boat rally could search for boat names and send a message to invite those users to the boat rally.

In another example, somebody who has just moved into a new apartment could include their apartment name, apartment number, their name, and a picture of themselves as a way of introducing themselves as their new neighbor without having to uncomfortably knock on their neighbors' doors to introduce themselves. Although people may feel comfortable greeting their adjacent neighbors personally, people will generally feel less comfortable knocking on the doors of neighbors who live on different floors above or below them. The tag-based social interaction computing system provides a way to let other people know that they may be receptive to social interactions. The tag-based social interaction computing system can also enable neighbors to anonymously send messages to one another, for example to ask a neighbor to reduce the volume on the TV or not vacuum at odd hours of the early morning.

Students matriculating a university can generate tags to encourage social interactions with other students and receive invitations to events sponsored by college organizations. People at bars or other social venues can similarly generate tags in hopes of meeting new people or receiving free drinks or food from people who may be interesting in getting to know them.

Referring now to FIG. 1, a non-limiting example of a tag-based social interaction platform schematically depicted as a tag-based social interaction computing system 100. The tag-based social interaction computing system 100 may be embodied as any type of server or computing device or computer devices that are capable of processing, communicating, storing, maintaining, and transferring data in accordance with the present disclosure. For example, the tag-based social interaction computing system 100 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the tag-based social interaction computing system 100 may be embodied as a computing device integrated with other platform, systems, or subsystems. In an example embodiment, individual users run an application on their cellphones, or other types of user networked computing devices, which interacts with tag-based social interaction computing system 100 that stores individual's accounts and enables interactions in accordance with the present disclosure.

Moreover, embodiments of the tag-based social interaction computing system 100, and other embodiments of the tag-based social interaction computing system described herein, can also be implemented in cloud computing environments. "Cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In the illustrative embodiment of FIG. 1, the tag-based social interaction computing system 100 includes a processor 102 and a memory unit 104. Data used by the tag-based social interaction computing system 100 can be from various data sources and stored in one or more databases 106. The data stored in the database 106 can be stored in a non-volatile computer memory, such as a hard disk drive, a read only memory (e.g., a ROM IC), or other types of non-volatile memory. In some embodiments, the database 106 can be stored on a remote electronic computer system, such as cloud-based storage, for example. As is to be appreciated, a variety of other databases or other types of memory storage structures can be utilized or otherwise associated with the tag-based social interaction computing system 100. As such, the data sources utilized by the tag-based social interaction computing system 100 may be embodied as any type of device or devices configured for short-term or long-term storage of data such as, for example, memory devices and circuits, memory cards, hard disk drives, solid-state drives, or other data storage devices. For example, in some embodiments, the data sources include storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or Blu-Ray disk, and so forth. Storage media such as flash drives, solid state hard drives, redundant array of individual disks (RAID), virtual drives, networked drives and other memory means including storage media on the processor 102 or the memory unit 104, are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The tag-based social interaction computing system 100 can include several computer servers and databases. For example, the tag-based social interaction computing system 100 can include one or more web servers 108, application servers 110, and/or any other type of servers. For convenience, only one web server 108 and one application server 110 are shown in FIG. 1, although it should be recognized that the disclosure is not so limited. The servers 108, 110 can comprise processors (e.g., CPUs), memory units (e.g., RAM, ROM), non-volatile storage systems (e.g., hard disk drive systems), etc. The servers 108, 110 can utilize operating systems, such as Solaris, Linux, or Windows Server operating systems, for example.

The web server 108 can provide a graphical web user interface through which various users of the system can interact with the tag-based social interaction computing system 100. The web server 108 can accept requests, such as HTTP requests, from clients and serve the client's responses, such as HTTP responses, along with optional data content, such as web pages (e.g., HTML documents) and linked objects (such as images, video, and so forth). The application server 110 can provide a user interface for users who do not communicate with the tag-based social interaction computing system 100 using a web browser. Such users can have special software installed on computing devices that allows them to communicate with the application server 110 via a communications network.

Of course, the tag-based social interaction computing system 100 may include other or additional components, such as those commonly found in a server, SaaS implementation, and/or a computer (e.g., various input/output devices). Additionally, in some embodiments, one or more of the illustrative components may be incorporated in, or otherwise form a portion of, another component. For example, the memory unit 104, or portions thereof, may be incorporated in the processor 102 in some embodiments. Furthermore, it should be appreciated that the tag-based social interaction computing system 100 may include other components, sub-components, and devices commonly found in a computer and/or computing device, which are not illustrated in FIG. 1 for clarity of the description.

The processor 102 may be embodied as any type of processor capable of performing the functions described herein. For example, the processor 102 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

The memory unit 104 may be embodied as any type of volatile or non-volatile memory or data storage capable of performing the functions described herein. For example, the memory unit 104 may be embodied as read only memory (ROM), random access memory (RAM), cache memory associated with the processor 102, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory unit 104 may store various data and software used during operation of the tag-based social interaction computing system 100 such as operating systems, applications, programs, libraries, and drivers.

While FIG. 1 depicts one example type of interaction between a User A and a User B by the tag-based social interaction computing system 100, it is to be appreciated that tag-based social interaction computing systems in accordance with the present disclosure can facilitate a wide array of interactions, such random acts of kindness, payment transactions, among numerous. Example types of interactions, functionalities, and methodologies are presented in FIGS. 2-17 and described in detail below. Furthermore, while only two users (User A and User B) are schematically depicted in FIG. 1 for the purposes of illustration, it is to be appreciated that a plurality of users can interact with the tag-based social interaction computing system 100 in accordance with the present disclosure.

Referring first to User A, a computing device 118 can be used to communicate with the tag-based social interaction computing system 100 via network communications. The computing device 118 can be any suitable computing device with a network connection, such as a laptop computer, desktop computer, smartphone, gaming system, tablet computer, and so forth. Through interactions with the tag-based social interaction computing system 100, User A can request that certain tags be created, as schematically depicted by request 112. As described in more detail below, tags created by tag-based social interaction computing system 100 can be tied to a wide array of objects, services, locations, activities, companies, and so forth. By way of example, a tag can be associated with a vehicle of User A, such as a license plate, or a name of a boat, for example. Additionally or alternatively, the tag can be a personal tag or "handle" for User A, which can be used by User A for various types of operations. In any event, the tag-based social interaction computing system 100 can generate the requested tags and associate the provisioned tags 114 with User A in the database 106, or other suitable data store.

As shown in FIG. 1, each of the provisioned tags 114 can be associated with various tag properties 116A-N. The tag properties 116A-N can be entered by User A, for example. The particular tag properties 116A-N can vary based on the tag. For example, tag properties 116A-for a tag 114 associated with User's A boat may include the length of the boat, the manufacturer of the boat, the boat's home port, among other properties. As is to be appreciated, a tags associated with User A's other vehicles and residence would each have different properties 116A-N.

User B is schematically shown inputting Tag B 122B into their computing device 126. Tags can be inputted into a computing device using any suitable technique, such as manual input, optical scanning, near-field communication, among others. The computing device 126 can be executing, for example, a specialized application associated with the tag-based social interaction computing system 100 or a web browser that allows web-based communication with the tag-based social interaction computing system 100. In any event, upon receiving the Tag B 112B, the computing device 126 can submit a tag query 128 to the tag-based social interaction computing system 100 that identifies the inputted tag. The tag-based social interaction computing system 100 can locate the tag identified in the tag query 128 in the database 106. Then, responsive to the tag query 128, the tag-based social interaction computing system 100 can return certain tag properties 130 to be displayed on the computing device 126 for User B. In some embodiments, the tag properties 130 can be a subset of the tag properties 116 that are associated with the Tab B 122B. In this regard, User A can determine which particular tag properties are to be provided to a user identifying the tag in a tag query 128. For example, the identity of the User A can be withheld from the tag properties 130 that are provided to the computing device 126 when a user submits a tag query 128 for Tag B 122B in order to keep User A anonymous. By comparison, Tag A 122A may be associated with a business offering of the User A. As such, when a User B submits a tag query 128 to the tag-based social interaction computing system 100 that includes Tag A 122A, the tag properties 130 returned can include User A's name, email address, phone number, address, and so forth. Similarly, a personal tag 124 can also be used by User A as a point of contact and connection to other user's of the platform, with User A selectively deciding how much information to provide to interested users.

Figure 2:
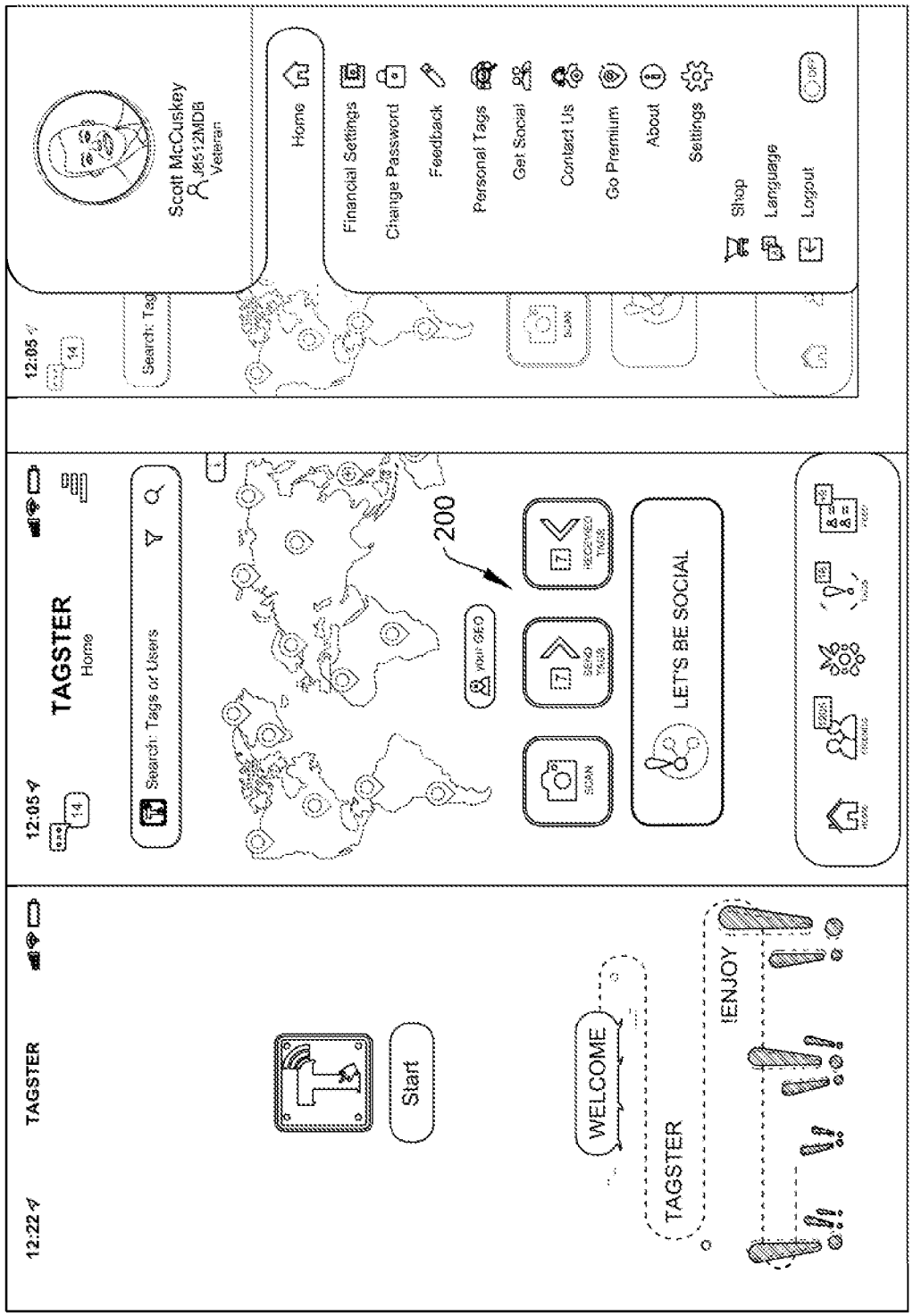
FIG. 2 illustrates an example splash screen and an example home screen suitable for display on the touchscreen interface of a user's smartphone or other suitable computing device.
Figure 17:
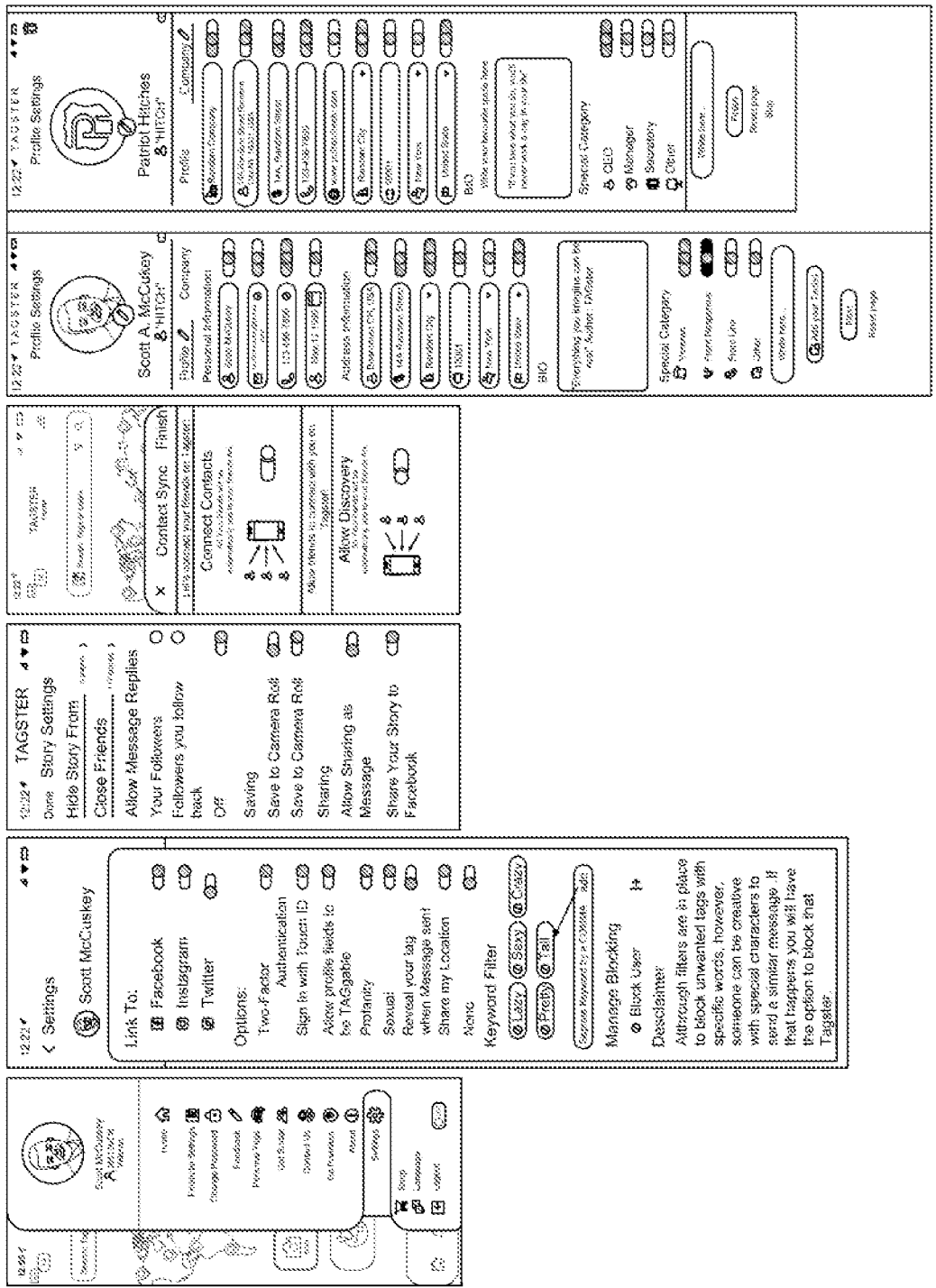

Referring now to FIGS. 2 and 17, non-limiting example display screens are provided. As is to be appreciated, however, the present disclosure is not limited to any particular display screen layout or design. Such display screens can be presented on the user computing devices 118 and 126 shown in FIG. 1, for example. As is shown, a user can log into an account on the tag-based social interaction computing system 100. The tag-based social interaction computing system 100 can operate on a mobile device and connect to services, such as cloud-based services, via an internet connection. The tag-based social interaction computing system 100 can also operate on any suitable computing platform as would be understood in the art, as provided above.

FIG. 2 illustrates an example splash screen and an example home screen suitable for display on the touchscreen interface of a user's smartphone or other suitable computing device. The home screen can present a graphic illustration, such as a map, that displays other users that the user can interact with or that the user has interacted with. The home screen can present a number of buttons 200, or other types of interaction elements, to the user to facilitate immediate interaction with the system, such as a search bar for searching for tags and users (see also FIGS. 9 & 11), a scan button for inputting a tag or user using, for example, the camera of the user's mobile device (see also FIG. 5), received and sent tag buttons (see also FIG. 8 below), a social button (see also FIGS. 9 and 15), as well as other selection options such as home, friends, grapevine, tags, and feed (FIGS. 2, 9, 13, 8, and 16, respectively.) If the user selects an information icon on the side of the screen, an additional navigation tool can pop up that presents the users with additional links to control other operations of the system, such as settings for financial information, passwords, logout and so forth.

If the user does not yet have an account, the user can create an account on the tag-based social interaction computing system 100 and provide personal identifiable information as illustrated in FIG. 17. For example, the user can provide their name, address, phone numbers, email address, and date of birth. The user may belong to a special category, such as a first responder, veteran, fireman, and so forth. A user may also provide additional information such as their employer or their company if self-employed. The user can select which of their information will be searchable through the system by other users and what information will be shared with other users if they connect socially with those other users.

Figure 3:
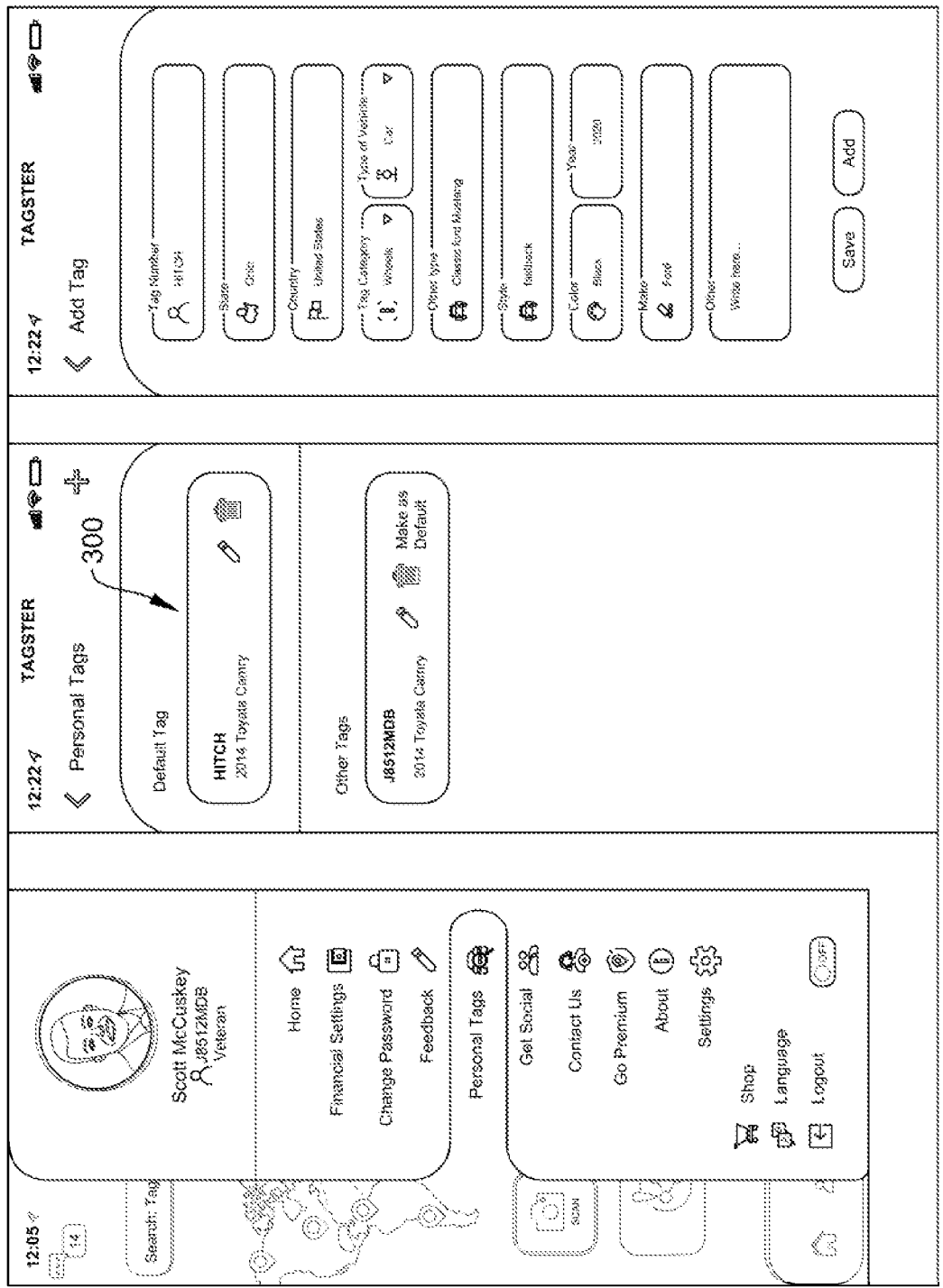
FIG. 3 illustrates an example tag creation screen suitable for display on the touchscreen interface of a user's smartphone or other suitable computing device.

Referring now to FIG. 3, the user can optionally create tags 300 that allows other users to connect with them. As provided above, tags in accordance with the present disclosure, can allow other users to quickly scan or enter a tag to interact with the user rather than searching based on other personal identifiable information, such as the user's name as is typically used on other social media platforms. When a user creates a tag, a unique tag number is generated that becomes associated with the user. For example, the user can create a tag that is placed on something owned by the user, such as a car or truck. The user can enter information about the vehicle, such as the make, model, year, color, year, license plate number, etc. Although a tag is generally placed on a vehicle, such as a car, truck, or watercraft, the tag can be associated with anything that the user wants. For example, the user can create a tag that will be placed on the user themselves, on a user's mailbox or place of residence, or anything else that the user desires. In embodiments, the information associated with the tag can be searchable by other users. Further, the tag can be associated with information that is already associated with the object, just as a license plate, a registration number, a boat name, an address, and so forth.

Tags advantageously allow a user to connect with other users using the tag, while potentially keeping their own personal identity private. For example, while an insurance sales agent or attorney may want to allow people to connect with them via their personal name, other individuals may not want to disclose their identity to everyone. For example, a high wealth individual who owns a sailboat may be interested in connecting with other similarly situated boat owners over a holiday weekend while out on the water, but may desire to keep their identity private from a person who merely views their boat name and is curious. Tag-based social interaction computing systems in accordance with the present disclosure allow a user to obfuscate or make public their personally identifiable information while still facilitating desirable social interaction through their tags. Once a user has created their account and entered their profile information and tags, the user can start interacting by tagging and receiving tags from other users through the tag-based social interaction computing system 100

Figure 4:
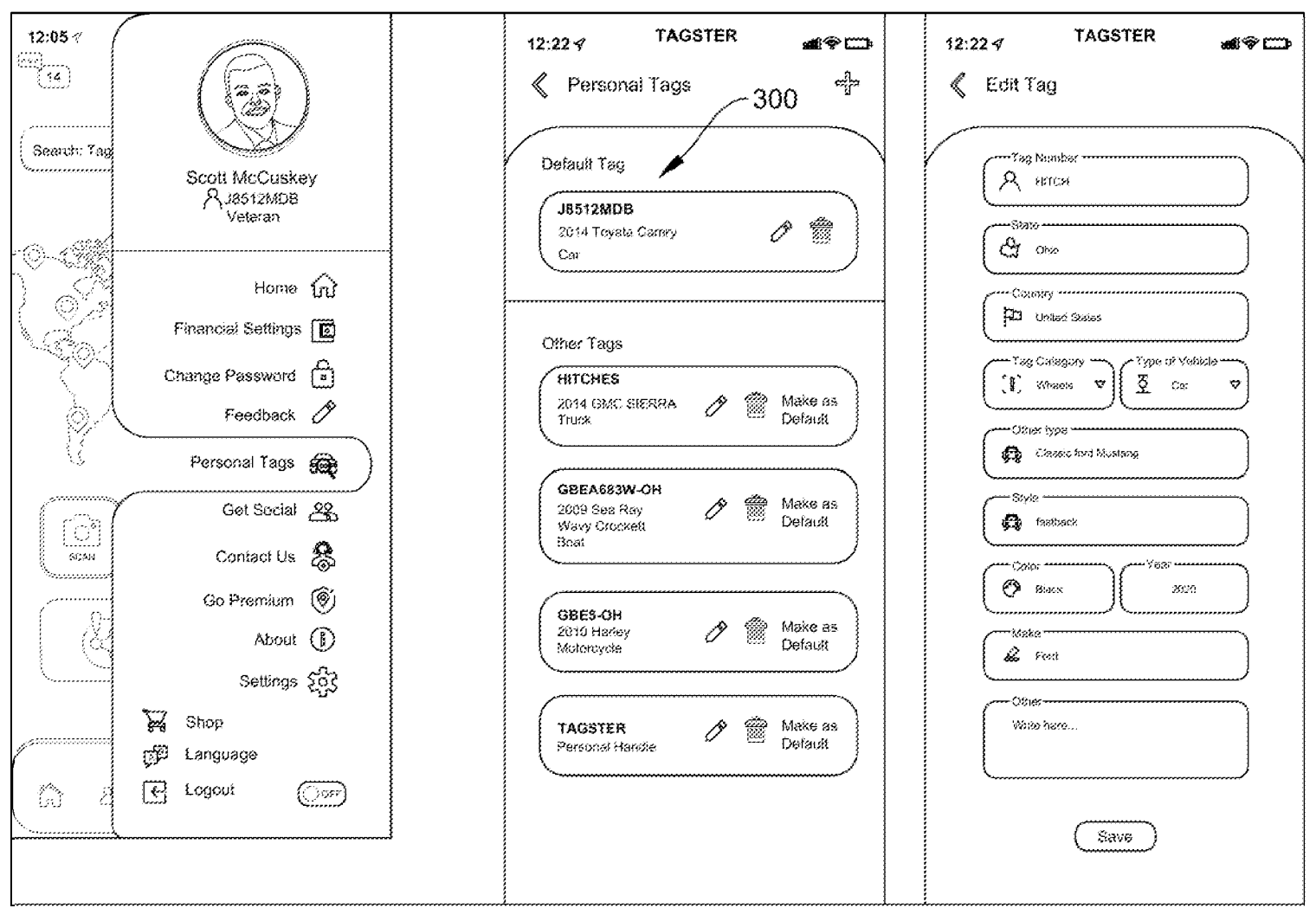

Referring now to FIG. 4, once the user has created one or more tags 300, the user can select and edit their existing tags, for example to update information or add additional keywords to allow other users to find them in searches. For example, a boat owner can include the name of their boat and make that keyword searchable by other users. A truck owner could include information such as their license plate number, the make, model, year, and color of their vehicle, or other identifiable information for searching such as special features like riser kits, hitch details, decals, specialty tires, and so forth. The user can select one of the tags to be used as the default tag information that is provided to other users when the user connects with them.

Figure 5:
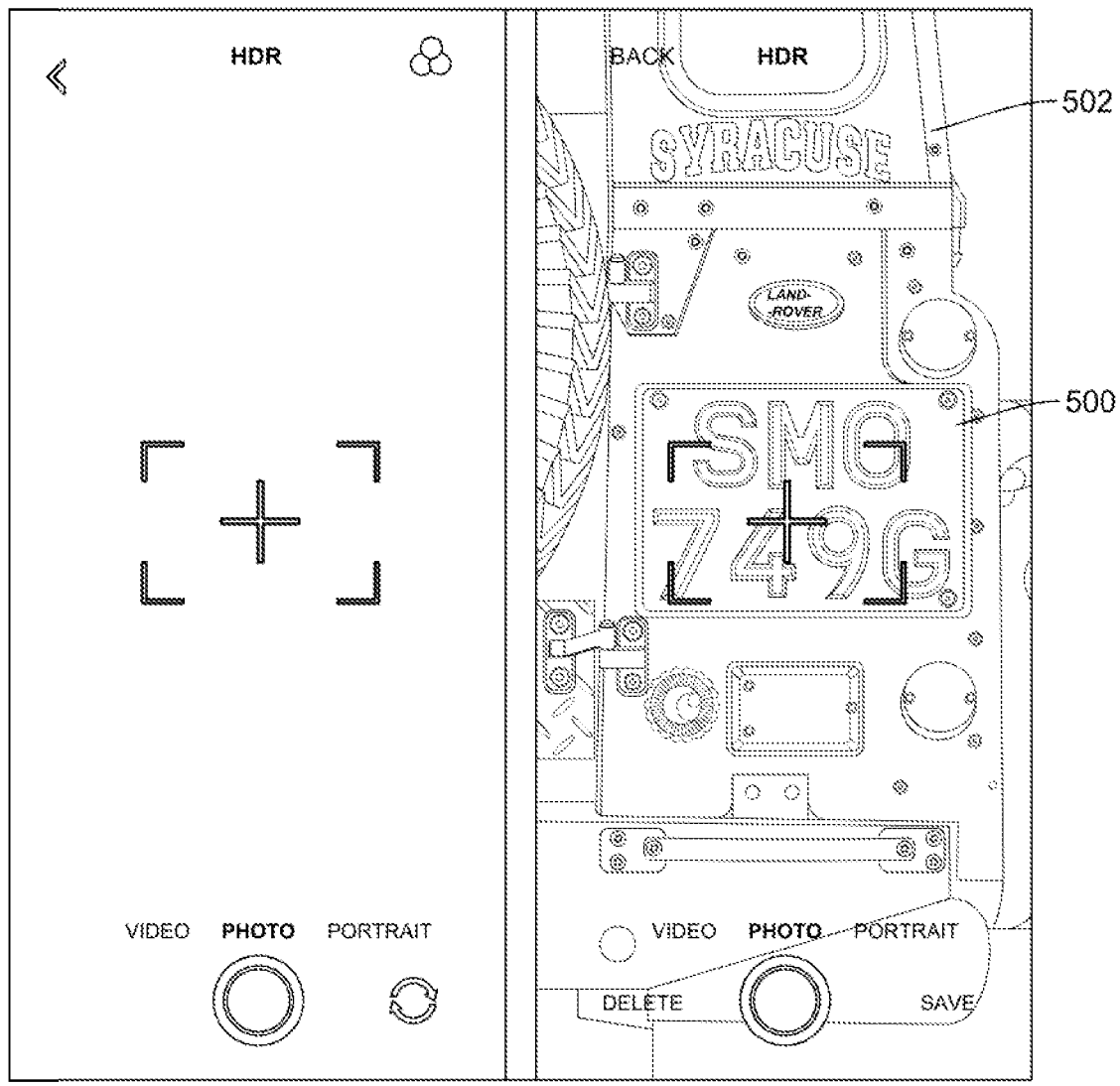
FIG. 5 depicts a user operating their mobile phone camera to capture a tag associated with a vehicle.

Referring now to FIG. 5, in addition to searching for other users of the tag-based social interaction computing system 100 by entering tags or keyword information manually, users can scan a tag displayed by another user to search for that user on the tag-based social interaction computing system 100. For example, as displayed in FIG. 5, the user can operate their mobile phone camera and point it at a tag or another identifier. In the illustrated example, a user points their camera at a license plate 500 of a vintage vehicle 502. The tag-based social interaction computing system 100 performs OCR (optical character recognition) of the letters, and determines if that number is associated with a registered user of the tag-based social interaction computing system 100. If the license plate is associated with a registered user, the tag-based social interaction computing system 100 can present the user with the registered user's public profile (see FIGS. 16 and 17 below). Notably, the public profile includes only the information that the registered user desires other people to see. The user can then select what the user desires to do, for example by attempting to contact the registered user (FIG. 10 below), adding that user to a grapevine (FIGS. 13 and 14 below), or sending a random act of kindness such as a gift or friendly message (FIG. 6 below).

Figure 6:
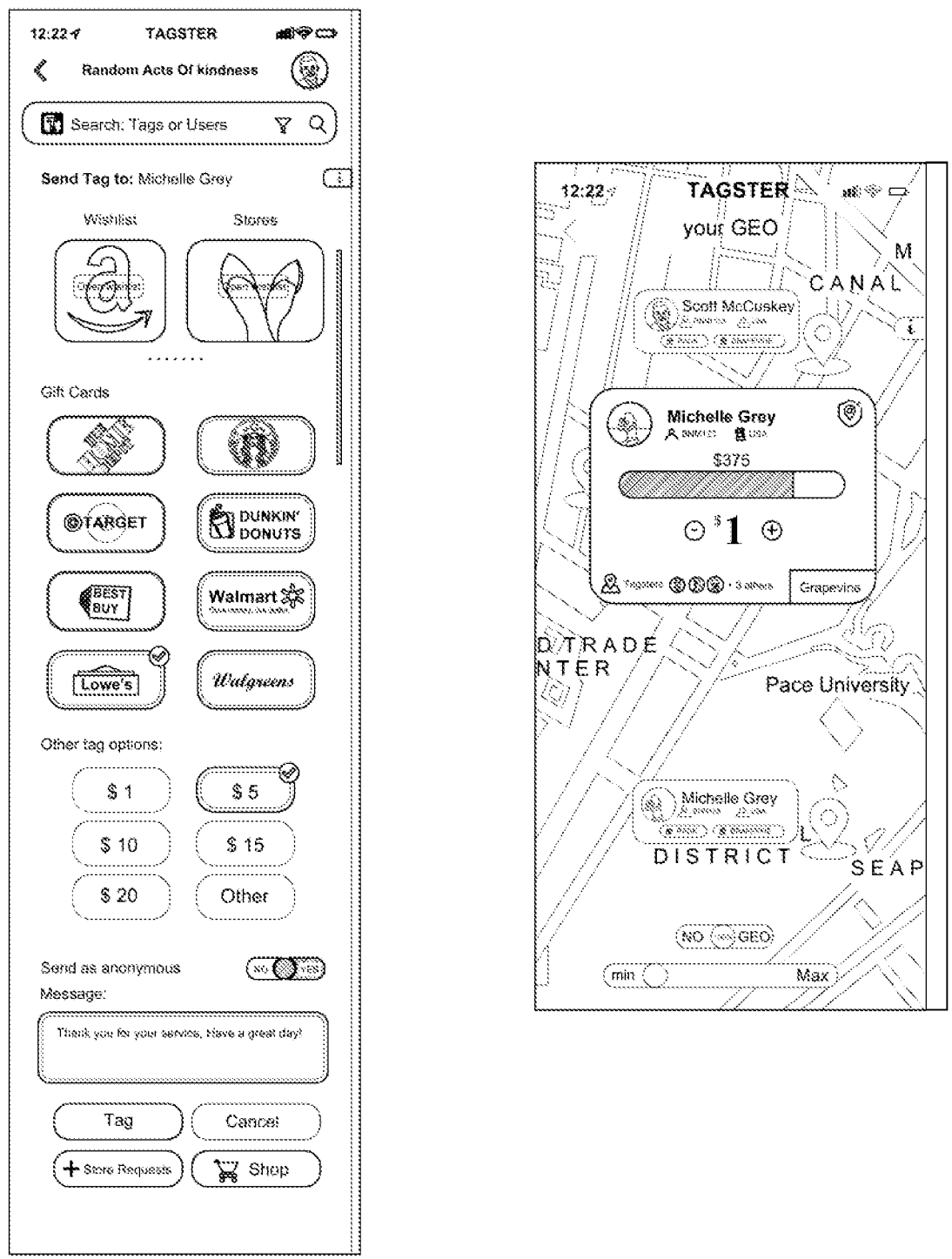
FIG. 6 illustrates example screens suitable for display on the touchscreen interface of a user's smartphone or other suitable computing device for sending a random act of kindness to another user.

Referring to FIG. 6, in order to send a random act of kindness, the user identifies which registered user of the tag-based social interaction computing system 100 is to receive the gift, for example after scanning that registered user's tag. Once a user has selected another user by scanning their tag or identifying the other user via a search, the user can select what they want to send to the other user. For example, the user can send a payment or a gift card to the tagged user, purchase an item for that user, for example from another user's public wish list on Amazon, or just send a message, for example a message of encouragement. The user can decide whether to share their contact information and their own tag number (such as personal tag 124, FIG. 1) or to remain anonymous.

Figure 7:
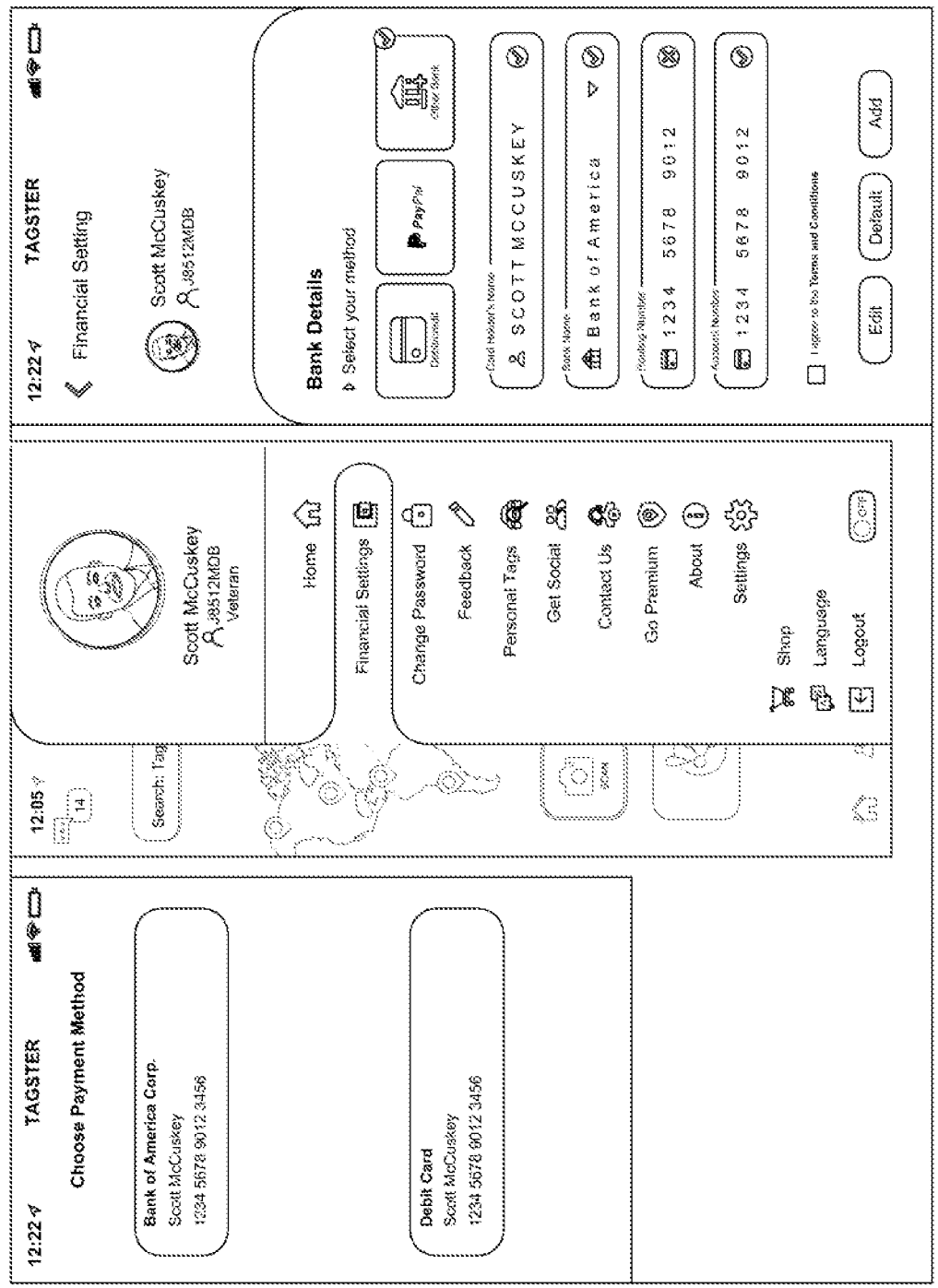
FIG. 7 illustrates an example digital wallet screen for display on the touchscreen interface of a user's smartphone or other suitable computing device.

Referring to FIG. 7, the user can select from available payment options in their digital wallet to pay for the random act of kindness. The user can add, edit, or delete payment options in their digital wallet 700. Beneficially, the use of a digital wallet allows a user to send money to another user through the tag-based social interaction computing system 100 while one or both of the user's remain anonymous. Similarly, a user can send another user a gift card or purchase an item for another user while still remaining anonymous.

In accordance with various embodiments, the digital wallet 700 of the tag-based social interaction computing system 100 can beneficially allow users to transfer money to any other user around the world within seconds. In other words, the tag-based social interaction computing system 100 can serve as a centralized money transfer service for worldwide usage without relying on other applications, financial institutions nor third parties to effectuate the transfer. Instead, users of the system can enjoy in-app transfers of money, which can be in the context of random acts of kindness, for example. Users can transfer and receive money in their country currency and, if the user's account on the tag-based social interaction computing system 100 is attached to a bank account, the user will not have to pay additional fees for fund transfers. In some embodiments, however, users using credit cards would be responsible for any additional charges/fees as may be required by credit card terms or payment networks.

Users of the tag-based social interaction computing system 100 can link a variety of different financial accounts to their digital wallet 700. Such financial accounts can be tied to credit/debit cards, checking accounts at a financial institution, and so forth. Once one or more financial accounts are linked, a user can choose to transfer funds to another user. Such transfer can be considered a "random act of kindness," as the transfer of funds is not in response any service performed by the recipient, nor is the transfer of funds associated with any type of purchase by the sender. Notably, such transfer of funds can occur without the use of a third party money transfer service, as many such third party money transfer services require a transfer of funds to be tied to a purchase of products or services. Instead, in accordance with the systems and method described herein, users of the tag-based social interaction computing system 100 can beneficially electronically transfer funds simply as a random act of kindness.

Furthermore, depending on what personal information they decide to make public through the tag-based social interaction computing system 100, personally identifiable information of the sender of the funds can be withheld from the recipient, thereby allowing the sender to send funds anonymously. In some embodiments, however, the sender can still share some information to the recipient to provide some indication of their identity, thereby sending funds semi-anonymously. For example, the sender may allow the tag-based social interaction computing system 100 to inform the recipient that the sender is a veteran or indicate the sender's place of residence, occupation, or any of wide variety of other non-personally identifiable information. In any event, funds can be transferred between users "in-app" in real-time, or at least substantially real time without significant delay and without the use of third-party funds transfer service.

Figure 8:
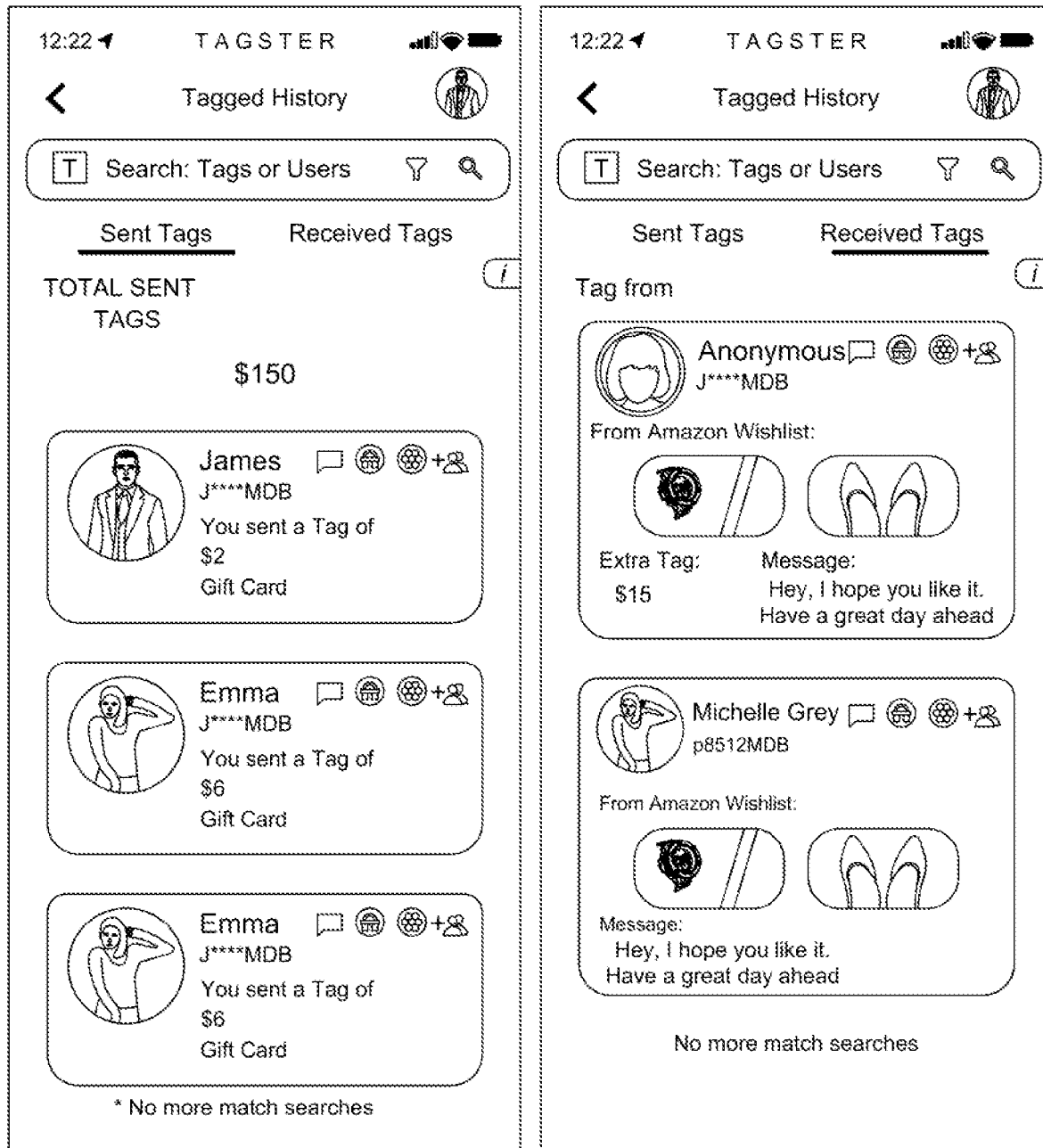
FIG. 8 illustrates an example list of tags that the user has received from other users and a list of tags that the user has sent to other users for display on the touchscreen interface of a user's smartphone or other suitable computing device.
Figure 9:
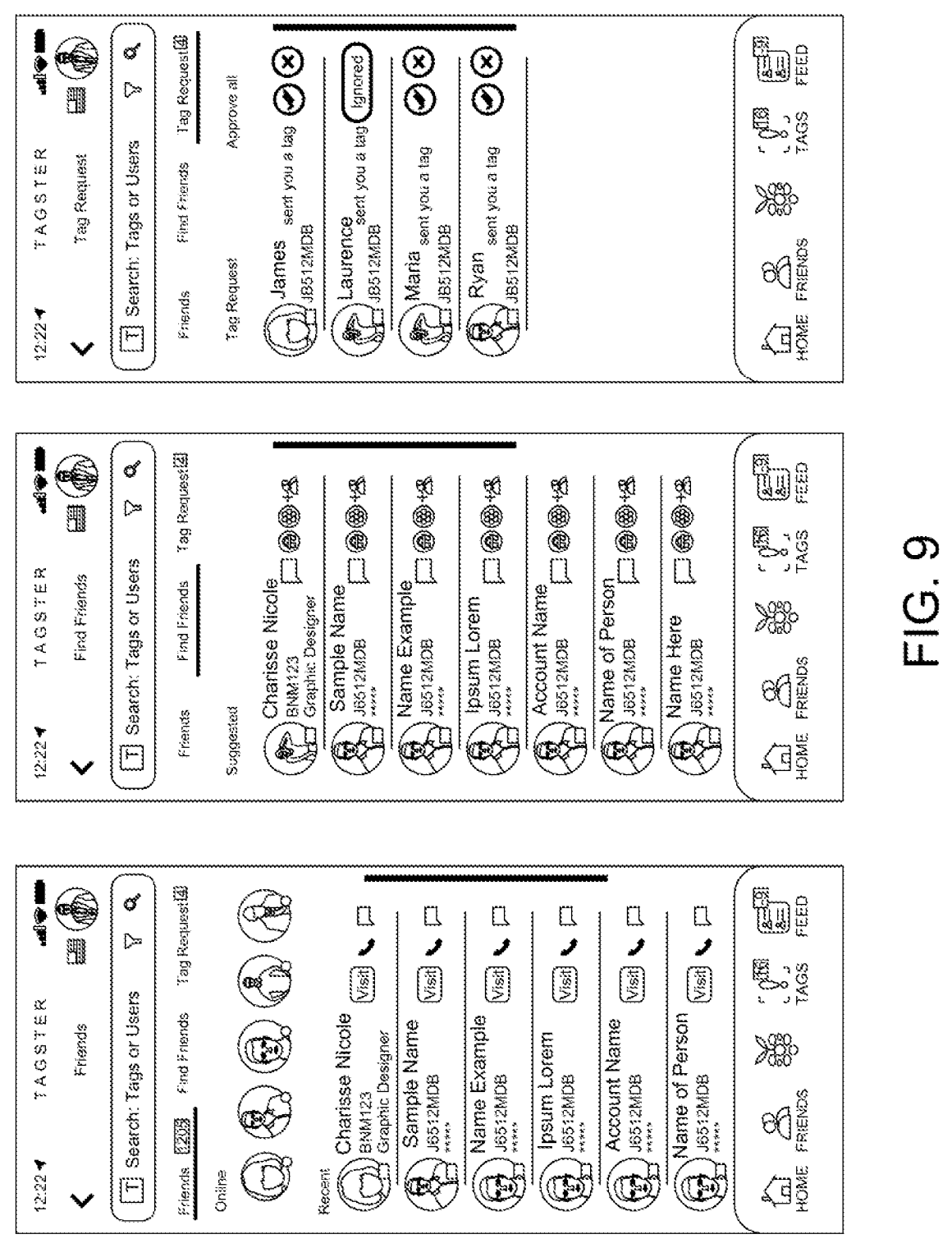

Referring to FIG. 8, the user can be presented with a list of tags 802 that the user has received from other users and the user can see the list of tags 804 that the user has sent to other users. The user can click individual on each tag in the history to see additional details. Each tag can include one or several selectable response buttons. When a user receives a tag from another user, it can include an optional message from the other user, the user can decide what actions to take. For example the user can accept a gift from the other user, decline the gift, send a message back, share their selected contact information with the other user, block the user, or forward the received gift to yet another user (i.e., grapevine.) For example, a registered user who has received a random act of kindness may be able to click a response button to open a message with the sender, but only if the sender permits responses. A user's tag history can be displayed. The tag history can display pending tags that the user has received, accepted tags, and rejected tags. The user can click on each tag in the history to see additional details Referring to FIG. 9, the user can have an address book of friends, for example friends imported from their mobile phone's address book and friends that they've made through the tag-based social interaction computing system 100. Each friend can include a photo icon, as well as buttons for interacting with their friends such as viewing their profile, messaging, or calling their friend. The user can tag a friend from the displayed list, for example to send a random act of kindness.

Users can also search for friends on the tag-based social interaction computing system 100. The tag-based social interaction computing system 100 can display information about another user identified by the search such as their tag information and any information that the user opted to provide during setup of their account information as described below with regard to FIG. 17. Users can invite their existing friends to set up their own accounts on the tag-based social interaction computing system 100. User can also receive tag requests from other users and decide whether to add them as friends. If a user receives a friend request from another user, the user can decide whether to accept the friend request, deny the request, or block the other user as desired.

Figure 10:
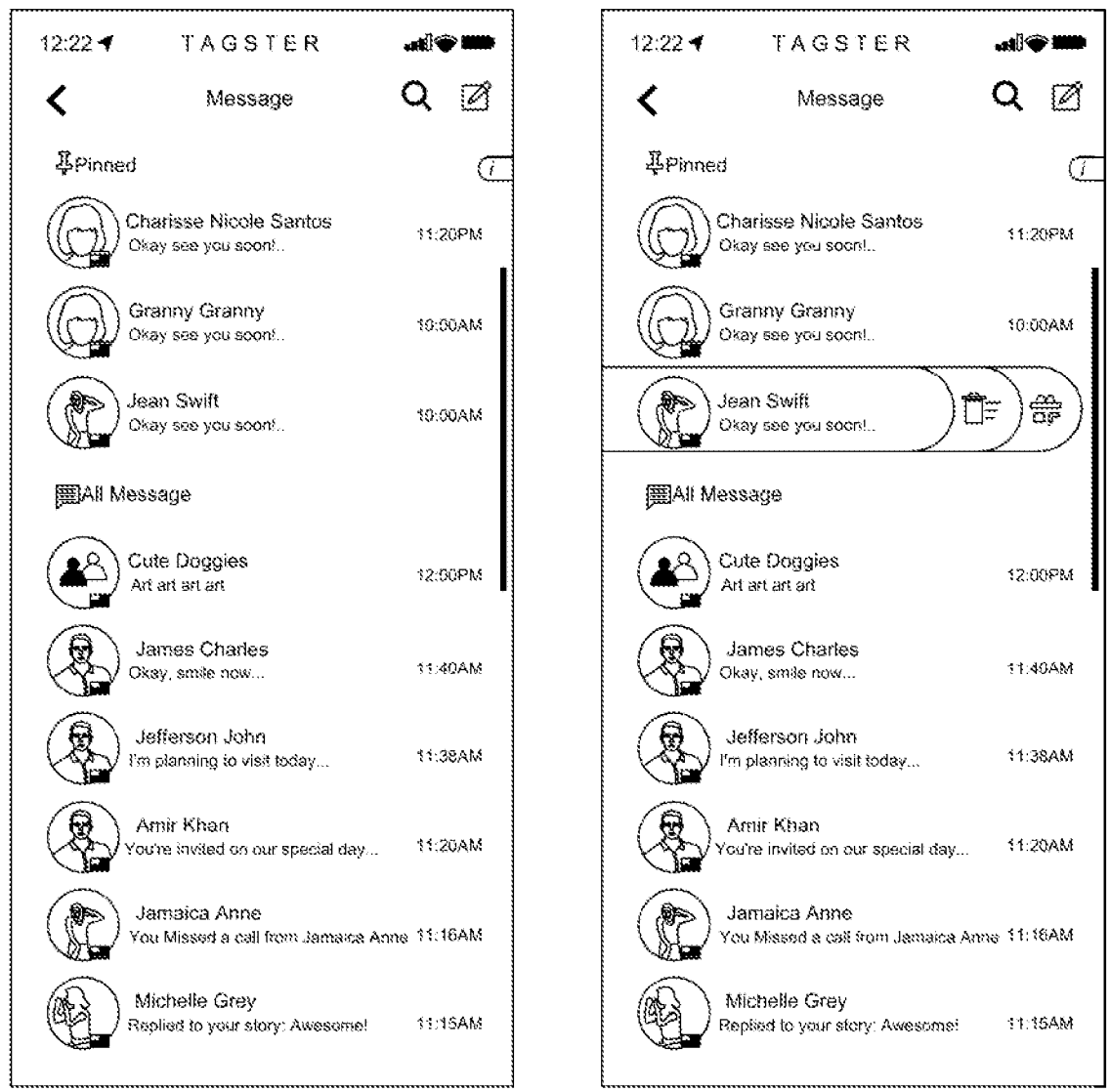
FIG. 10 illustrates a messaging screen for display on the touchscreen interface of a user's smartphone or other suitable computing device.

Referring to FIG. 10, the tag-based social interaction computing system 100 can facilitate communications between users, allowing users to send messages to one another. Users can also manages messages and send random acts of kindness to one another directly through the tag-based social interaction computing system 100. The tag-based social interaction computing system 100 can allow selected friends to be pinned to the top of the message list. This advantageously allows a user to keep track of interactions with selected friends. For example, if a friend is having a difficult time, the user may desire to pin that friend to the top of the message list so that the user remembers to send daily affirmations or random acts of kindness more frequently.

Figure 11:
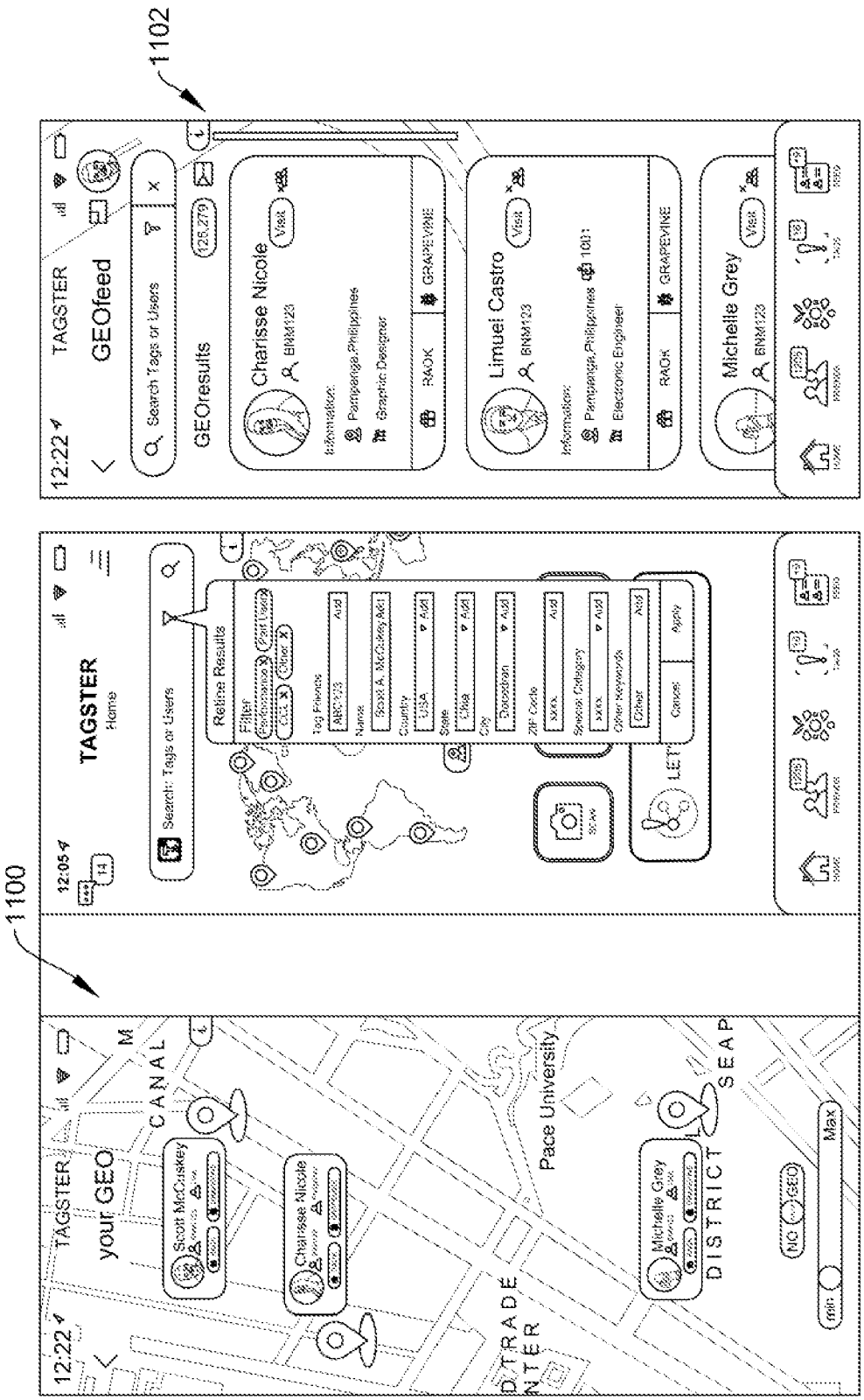
FIG. 11 illustrates a map and geofeed feature for display on the touchscreen interface of a user's smartphone or other suitable computing device.

Referring to FIG. 11, the tag-based social interaction computing system 100 can include a map 1100 and geofeed feature 1102. The map 1100 can display the position of nearby tags, the position of friends' tags, and so forth. A received tag can include a map that shows where the gift was received. Users can enter search terms to refine results on the map, for example to narrow the search by geography, by friend, or by search term. For example, a user can narrow searches to boats within a particular distance to find tagged boats in the same harbor or area where they are currently boating or where they plan to be. In another example, a user can use the map to identify a nearby tag that they were not clearly able to determine visually.

Figure 12:
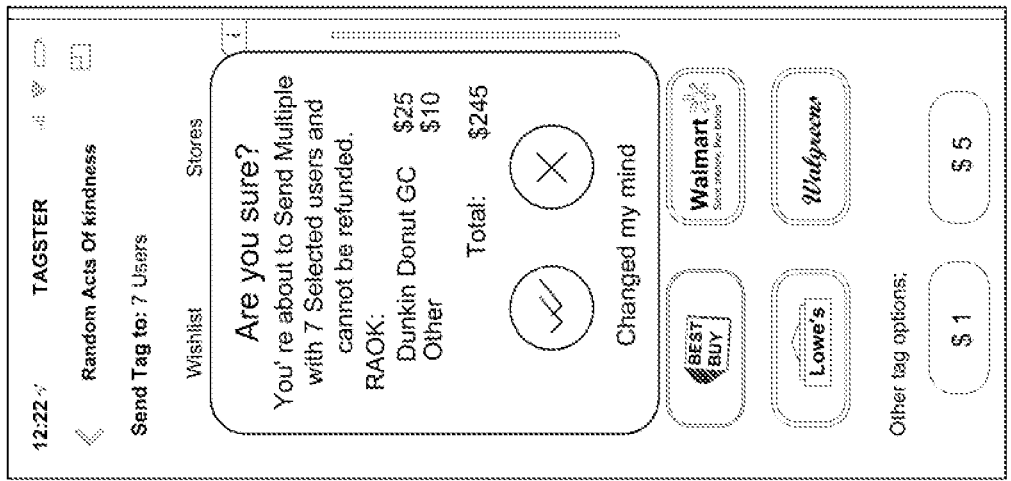
FIG. 12 illustrates a random acts of kindness feature for display on the touchscreen interface of a user's smartphone or other suitable computing device.
Figure 12:
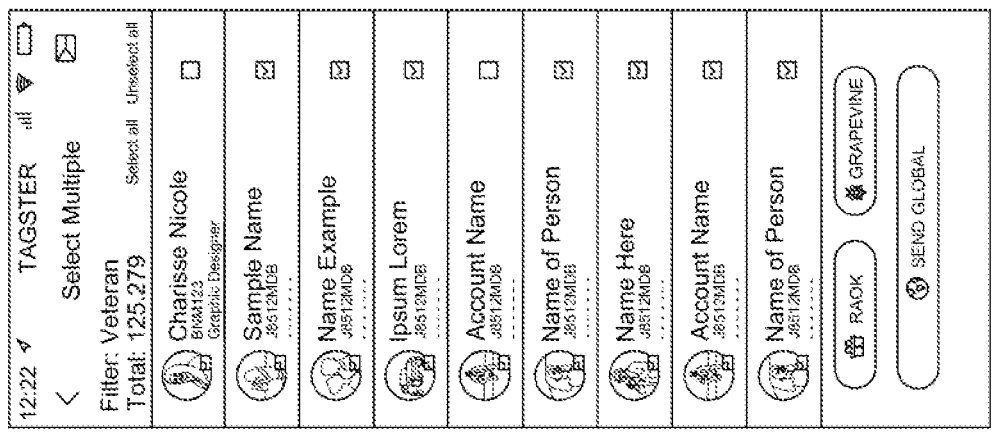
Figure 12:
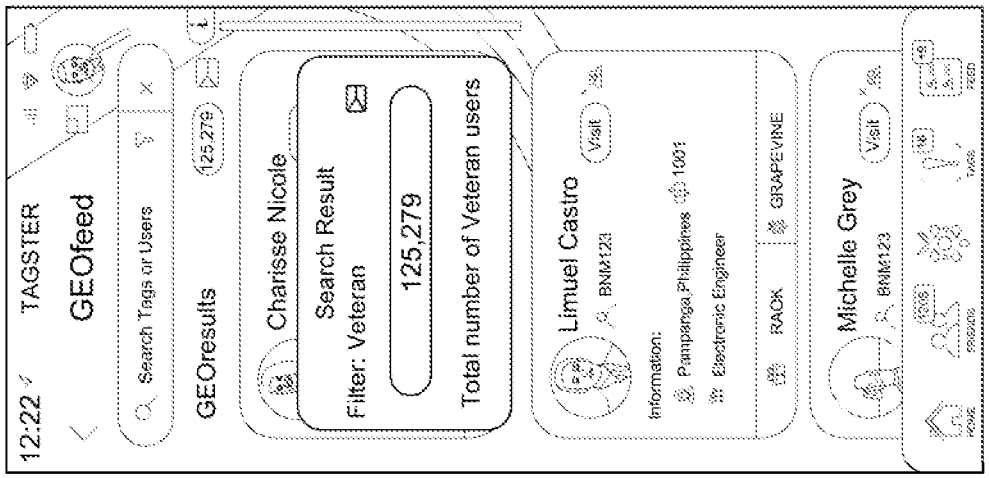

Referring to FIG. 12, the tag-based social interaction computing system 100 can allow multiple users to be selected for random acts of kindness. A user can select multiple users in various ways, for example using the geofeed feature 1102 to select users, using their friend list to select multiple users, or using a search to identify multiple users. In the illustrated example, the user entered the keyword "veteran" to identify users on the tag-based social interaction computing system 100 who have included the term "veteran" in their profile. From the search results, the user can select all or a subset of users to receive a random act of kindness, in this particular example a gift card from a well-known coffee and donut chain.

Figure 13:
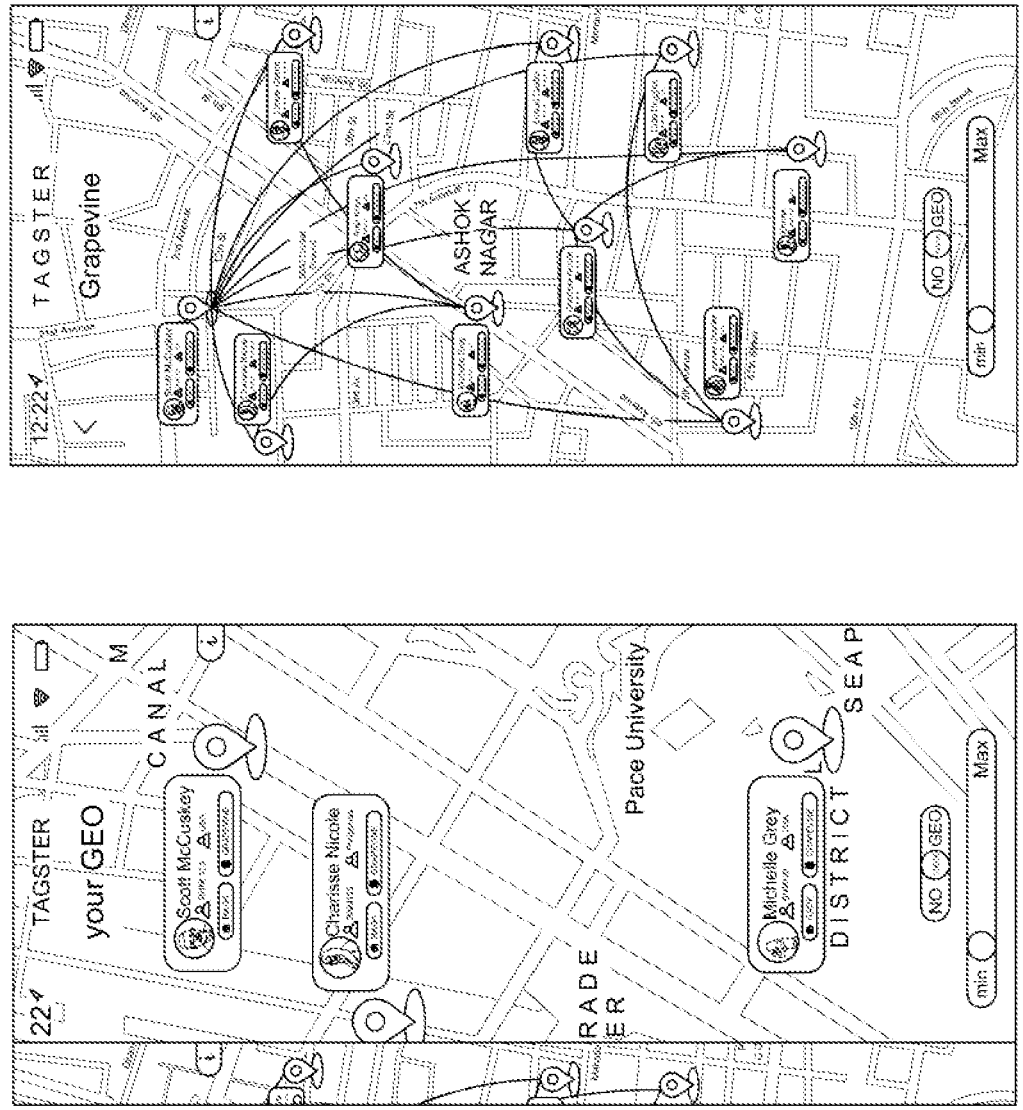
FIGS. 13-15 illustrate random acts of kindness and grapevine features for display on the touchscreen interface of a user's smartphone or other suitable computing device.
Figure 14:
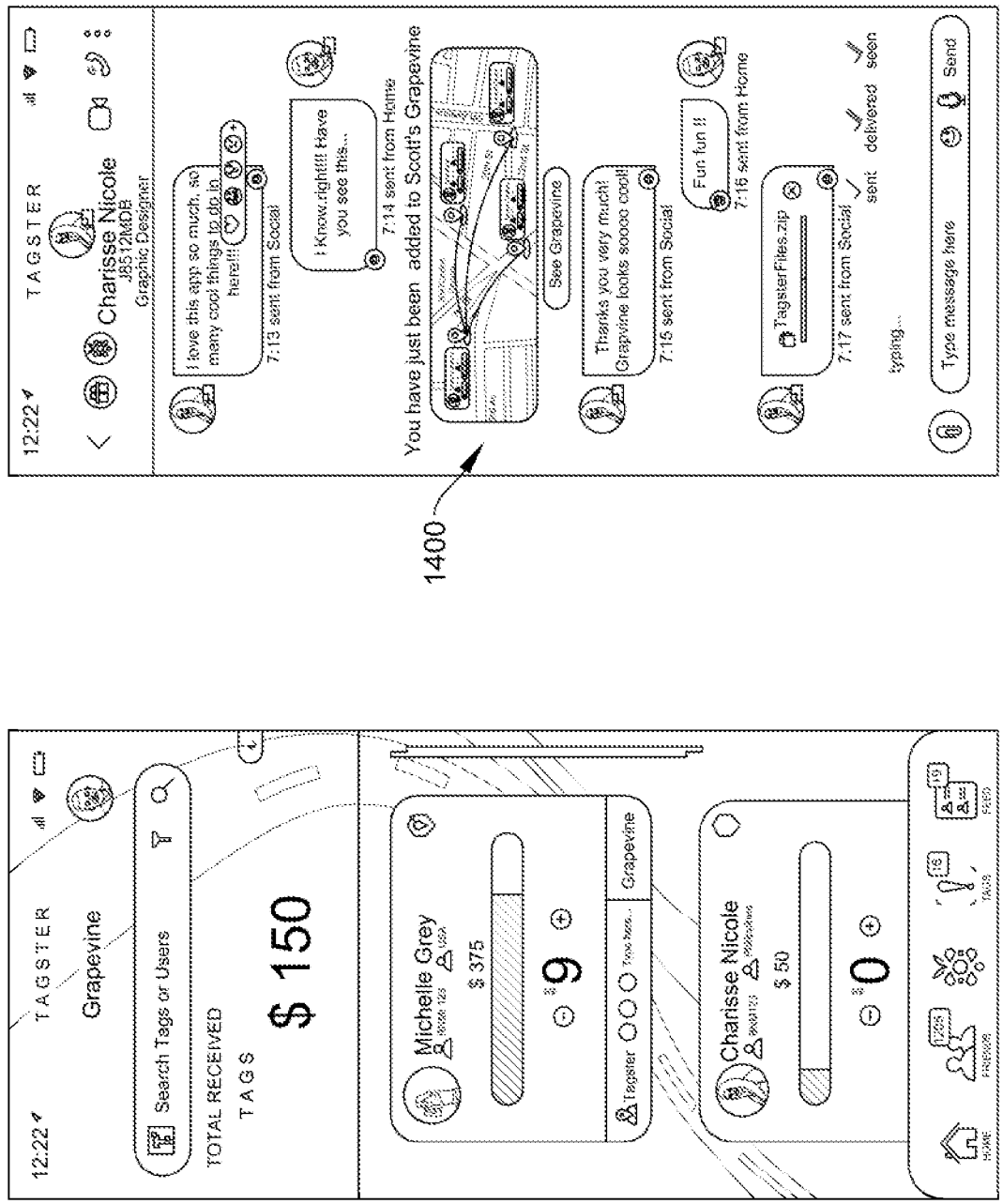
Figure 15:
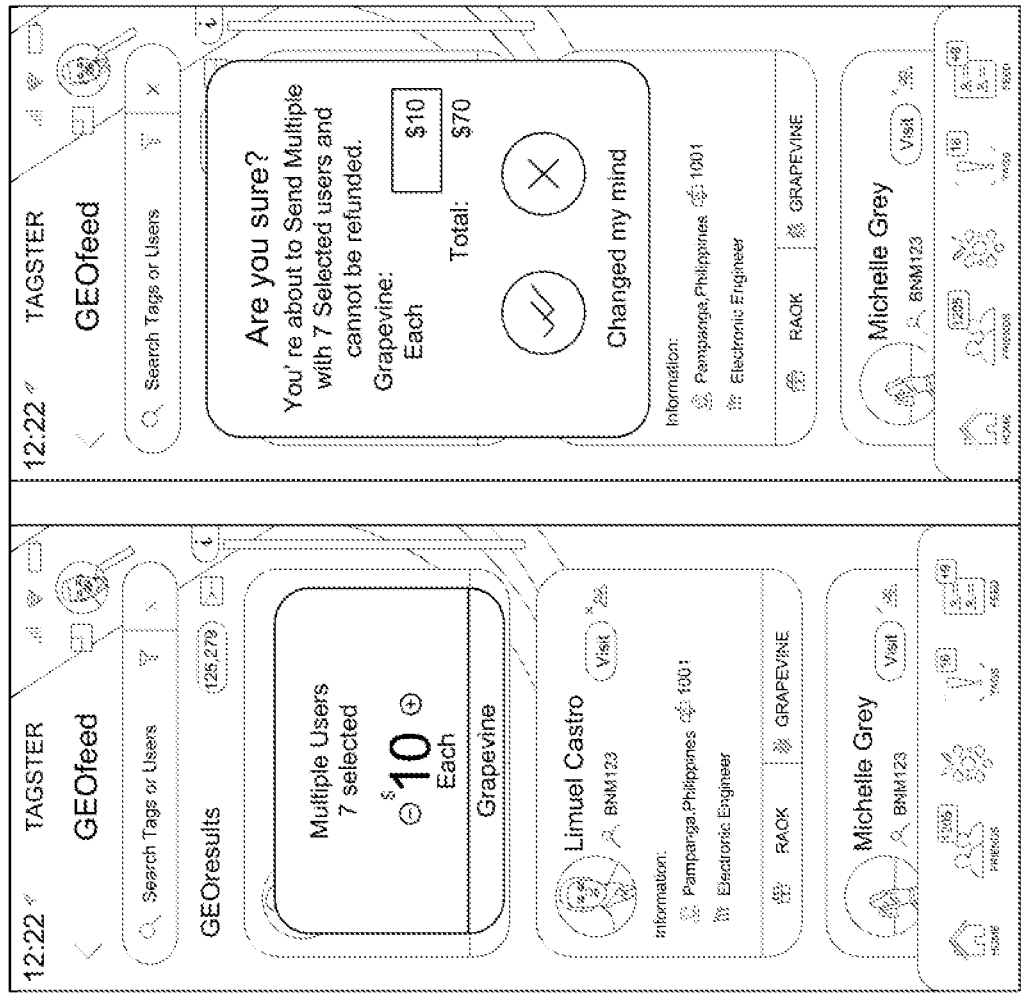
Figure 15:
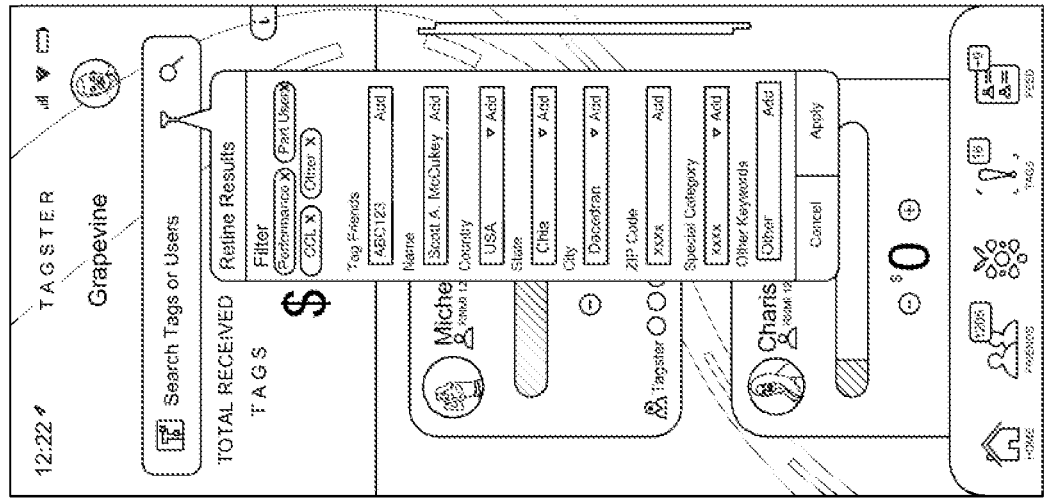

Referring to FIGS. 13, 14, and 15, tags can be associated with one another in a grapevine feature. The grapevine feature allows a received tag to be associated with another tag, which can then be associated with yet another tag. This advantageously allows users to see how a single random act of kindness cascades to create additional random acts of kindness by other users. The grapevine feature can include a map to visually represent the connections between random acts of kindness as illustrated in FIG. 13.

FIG. 14 illustrates notification windows associated with grapevines. When a user receives a random act of kindness that is associated with a grapevine, the user can see other related random acts of kindness associated with that grapevine. The user can use the received random act of kindness, or pass part or all of it along to another user, which are then displayed as associated random acts of kindness. The user can also receive a message that includes a map representation 1400 of the grapevine, which can include all or part of the grapevine. Advantageously, associating random acts of kindness with a grapevine encourages users to perform their own random acts of kindness and promotes use of the grapevine feature.

Referring to FIG. 15, the grapevine feature includes the ability to allow multiple users to be selected for random acts of kindness similar to the multi-user random act of kindness feature associated with FIG. 11. Advantageously, sending multiple acts of kindness increases the likelihood that a grapevine with propagate and continue to grow over time, thereby encouraging more giving of random acts of kindness.

Figure 16:
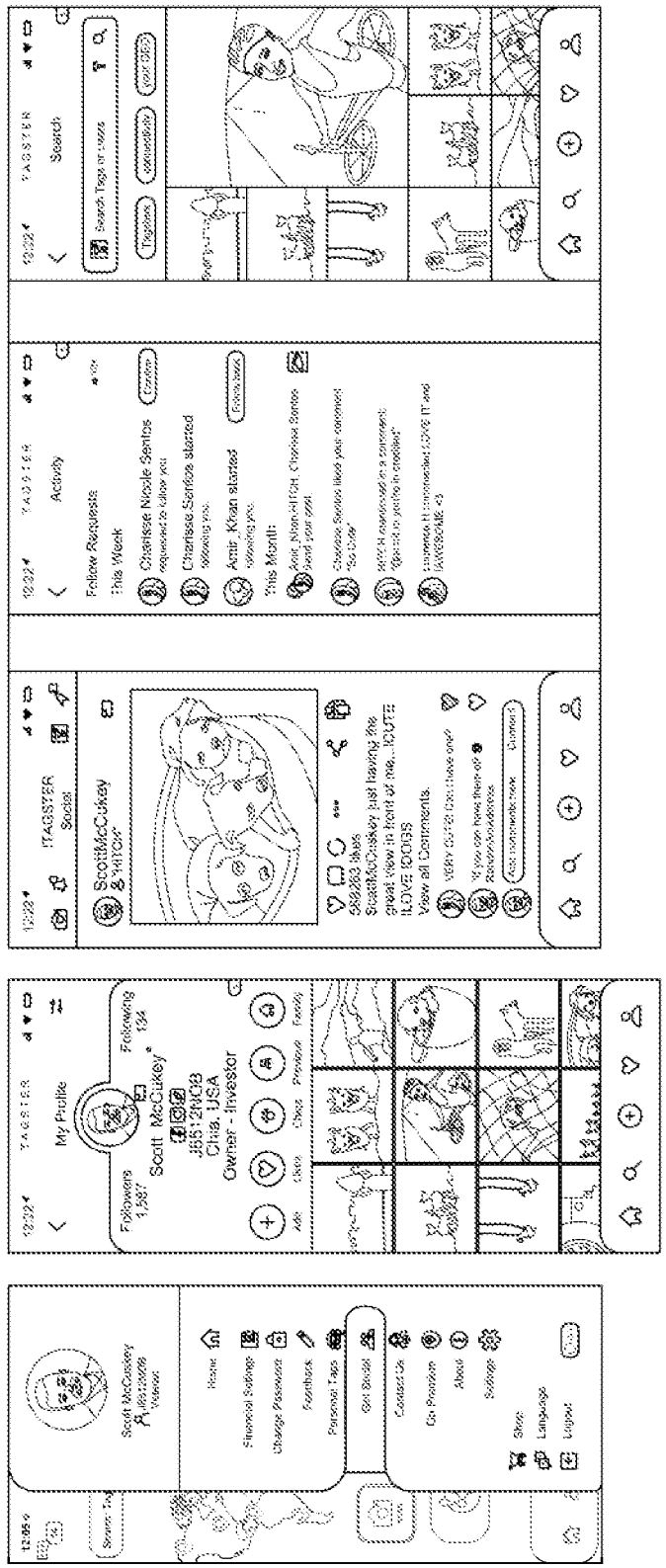
FIGS. 16-17 illustrate user profile modification screens for display on the touchscreen interface of a user's smartphone or other suitable computing device.

Referring to FIGS. 16 and 17, the tag-based social interaction computing system 100 can provide users with the ability to manage their public-facing and private-facing profiles. FIG. 16 illustrates a registered user's public-facing profile, which can include photos, as well as comments from friends and the user. The user can also view an activity window that displays a chronological news feed to the user showing a list of all of the interactions that the user has had with other users via the tag-based social interaction computing system 100. A search window allows the user to quickly see snapshots of other registered users.

Referring to FIG. 17, a user is able to configure various setting for the tag-based social interaction computing system 100 including linking options for posting on other social media platforms, sign-in and other authentication configurations, filter options to limit offensive words or users, and setting related to sharing posts and allowing comments from other users. A user can import friends from their mobile phone's contacts, and configure whether to allow other users to discover the user's tags when importing contacts. A user can also have multiple related profiles, for example a person profile and a company profile. The user can determine which personally identifiable information is shared publically and which is only shared privately. As illustrated in FIG. 17, a user can enter personally identifiable information when they set up their user account, but dynamically make the determination at a later time as to which information is privately shared only with friends, which information is publically shared, and which information is not shared. Advantageously, the use of simple selection indicator buttons and clear visual indicators can allow user to dynamically configure privacy settings while ensuring that they only share the information that they intend to share.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

I claim:

1. A tag-based social interaction computing system comprising instructions stored in a memory, which when executed by one or more processors of the tag-based social interaction computing system, cause the tag-based social interaction computing system to:
   (a) create a first account for a first user; and receive, from a first user computing device, financial information that identifies a financial account of the first user;
   (b) create a second account for a second user; and receive, from a second user computing device, (i) financial information that identifies a financial account of the second user, (ii) personally identifiable information from the second user, and (iii) non-personally identifiable information from the second user;
   (c) receive, from the first user computing device, a request to create a tag for the first user, and a plurality of tag properties associated with the tag;
   (d) generate the tag, associate a unique identifier with the tag, and add the tag to a plurality of tags stored in a database, wherein each of the plurality of tag properties is associated with the tag in the database, and the tag is associated with the first user in the database;
   (e) subsequent to the generation of the tag, receive, from the second user computing device a tag query, wherein the tag query identifies the tag;
   (f) responsive to the tag query, cause at least one of the plurality of tag properties to be displayed on the display of the second user computing device; and
   (g) receive, from the second user computing device, a payment request to transfer funds from the financial account of the second user to the financial account of the first user, wherein the first user does not receive personally identifiable information of the second user, and wherein the first user receives non-personally identifiable information of the second user.

2. The tag-based social interaction computing system of claim 1, further comprising a physical tag comprising the unique identifier, wherein the physical tag is affixed to physical property and is usable by a third user computing device to submit a second tag query.

3. The tag-based social interaction computing system of claim 2, wherein the second tag query is responsive to an optical scan of the physical tag by the third user computing device.

4. The tag-based social interaction computing system of claim 1, wherein the tag is associated with a vehicle of the first user and the plurality of tag properties are associated with the vehicle.

5. The tag-based social interaction computing system of claim 4, wherein the plurality of tag properties comprise any of a license plate number, a manufacturer of the vehicle, a model of the vehicle, and a year of the vehicle.

6. The tag-based social interaction computing system of claim 4, wherein the vehicle is a boat and plurality of tag properties comprises any of a boat name and a manufacturer of the boat.

7. The tag-based social interaction computing system of claim 1, wherein the instructions stored in a memory further cause the tag-based social interaction computing system to:
   cause the electronic transfer of funds from the financial account of the second user to the financial account of the first user.

8. The tag-based social interaction computing system of claim 7, wherein the instructions stored in a memory further cause the tag-based social interaction computing system to:

receive, from the first user computing device, a payment request to transfer at least a portion of the funds from the financial account of the first user to a financial account of another user.

9. The tag-based social interaction computing system of claim 7, wherein the instructions stored in a memory further cause the tag-based social interaction computing system to:
receive, from the first user computing device, a first payment request to transfer a first portion of the funds from the financial account of the first user to a financial account of a third user; and
receive, from the first user computing device, a second payment request to transfer a remaining portion of the funds from the financial account of the first user to a financial account of a fourth user.

10. The tag-based social interaction computing system of claim 7, wherein the instructions stored in a memory further cause the tag-based social interaction computing system to:
receive, from the first user computing device, a payment request to transfer all of the funds from the financial account of the first user to a financial account of a third user.

11. The tag-based social interaction computing system of claim 1, wherein at least one of the first user computing device and the second user computing device is a mobile communications device.

12. The tag-based social interaction computing system of claim 1, wherein the non-personally identifiable information of the second user received by the first user comprises an indication that the second user is a veteran.

13. The tag-based social interaction computing system of claim 1, wherein the non-personally identifiable information of the second user received by the first user identifies a residence of the second user.

14. The tag-based social interaction computing system of claim 1, wherein the non-personally identifiable information of the second user received by the first user identifies an occupation of the second user.

15. The tag-based social interaction computing system of claim 1, wherein transfer of funds from the financial account of the second user to the financial account of the first user is an anonymous transaction.

16. The tag-based social interaction computing system of claim 1, wherein transfer of funds from the financial account of the second user to the financial account of the first user is a semi-anonymous transaction.

17. A tag-based social interaction computing system comprising instructions stored in a memory, which when executed by one or more processors of the tag-based social interaction computing system, cause the tag-based social interaction computing system to:
(a) create a first account for a first user; and receive, from a first user computing device, wherein a financial account of the first user is associated with the first account;
(b) create a second account for a second user; and receive, from a second user computing device, (i) financial information that identifies a financial account of the second user, (ii) personally identifiable information from the second user, and (iii) non-personally identifiable information from the second user;
(c) receive, from the first user computing device, a request to create a tag for the first user, and a plurality of tag properties associated with the tag, wherein the plurality of tag properties comprises a geographical location;
(d) generate the tag and add the tag to a plurality of tags stored in a database, wherein each of the plurality of tag properties is associated with the tag in the database, and the tag is associated with the first user in the database;
(e) subsequent to the generation of the tag, cause an interface to display on a display of the second user computing device, wherein the interface comprises:
(i) a visual map of a geographical area;
(ii) a plurality of icons positioned on the visual map, wherein:
(A) each icon of the plurality of icons is associated with a corresponding tag of the plurality of tags;
(B) the presence of each icon on the visual map is based on the geographical location of the corresponding tag being within the geographical area; and
(f) receive, from the second user computing device and in response to the second user selecting an icon of the plurality of icons on the visual map that corresponds to the tag, a tag query, wherein the tag query identifies the tag;
(g) responsive to the tag query, cause at least one of the plurality of tag properties to be displayed on the display of the second user computing device; and
(h) receive, from the second user computing device, a payment request to transfer funds from the financial account of the second user to the financial account of the first user, wherein the first user does not receive personally identifiable information of the second user, and wherein the first user receives non-personally identifiable information of the second user.

18. The tag-based social interaction computing system of claim 17, further comprising a physical tag comprising the unique identifier, wherein the physical tag is affixed to physical property and is usable by a third user computing device to submit a second tag query.

19. The tag-based social interaction computing system of claim 17, wherein the second tag query is responsive to an optical scan of the physical tag by the third user computing device.

20. The tag-based social interaction computing system of claim 1, wherein at least one of the first user computing device and the second user computing device is a mobile communications device.

* * * * *

UNITED STATES PATENT AND TRADEMARK OFFICE
CERTIFICATE OF CORRECTION

PATENT NO. : 12,093,920 B2
APPLICATION NO. : 18/213315
DATED : September 17, 2024
INVENTOR(S) : Scott A. McCuskey It is certified that error appears in the above-identified patent and that said Letters Patent is hereby corrected as shown below:

In the Specification

Column 7, Line 43, change "tags" to --tag--;
Column 8, Line 12, change "user's" to --users--;
Column 11, Line 60, change "manages" to --manage--;

In the Claims

Claim 6, Column 14, Line 56, change "and plurality" to --and the plurality--;
Claim 17, Column 15, Lines 52-54, change "computing device, wherein a financial account of the first user is associated with the first account;" to --computing device, a financial account of the first user associated with the first account;--.

Signed and Sealed this
Twelfth Day of November, 2024

Katherine Kelly Vidal
*Director of the United States Patent and Trademark Office*